(12) United States Patent
Shaddad et al.

(10) Patent No.: US 11,807,948 B2
(45) Date of Patent: Nov. 7, 2023

(54) METHOD OF PRODUCING HYDROGEN PEROXIDE USING NANOSTRUCTURED BISMUTH OXIDE

(71) Applicant: KING SAUD UNIVERSITY, Riyadh (SA)

(72) Inventors: Maged N. Shaddad, Riyadh (SA); Prabhakarn Arunachalam, Riyadh (SA); Abdullah M. Almayouf, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 675 days.

(21) Appl. No.: 16/829,777

(22) Filed: Mar. 25, 2020

(65) Prior Publication Data

US 2021/0102301 A1   Apr. 8, 2021

Related U.S. Application Data

(62) Division of application No. 16/592,713, filed on Oct. 3, 2019, now Pat. No. 10,683,577.

(51) Int. Cl.
*C25B 1/30* (2006.01)
*C25B 11/051* (2021.01)
(Continued)

(52) U.S. Cl.
CPC .............. *C25B 1/30* (2013.01); *C25B 11/051* (2021.01); *C25B 11/067* (2021.01);
(Continued)

(58) Field of Classification Search
CPC ......................................... C25B 1/30
See application file for complete search history.

(56) References Cited

U.S. PATENT DOCUMENTS

| | | | |
|---|---|---|---|
| 7,011,908 | B1 | 3/2006 | Atwater et al. |
| 2016/0298245 | A1* | 10/2016 | Ghanem .................. C25B 1/30 |

FOREIGN PATENT DOCUMENTS

| | | |
|---|---|---|
| CN | 105951117 A | 9/2016 |
| CN | 105970247 A | 9/2016 |

(Continued)

OTHER PUBLICATIONS

Li et al, "Fundamental principles and environmental applications of electrochemical hydrogen peroxide production: A review," Chemical Engineering Journal 452 (2023) 139371 (Year: 2023).*

(Continued)

*Primary Examiner* — Salil Jain
(74) *Attorney, Agent, or Firm* — Nath, Goldberg & Meyer; Richard C. Litman (57) ABSTRACT

The method of producing hydrogen peroxide using nanostructured bismuth oxide is an electrochemical process for producing hydrogen peroxide using a cathode formed as oxygen-deficient nanostructured bismuth oxide deposited as a film on the surface of a conducting substrate. An anode and the cathode are immersed in an alkaline solution saturated with oxygen in an electrolytic cell. An electrical potential is established across the cathode and the anode to initiate electrochemical reduction of the oxygen in the alkaline solution to produce hydrogen peroxide by oxygen reduction reaction.

4 Claims, 10 Drawing Sheets

(51) Int. Cl.
*C25B 11/069* (2021.01)
*C25B 11/077* (2021.01)
*C25B 15/029* (2021.01)
*C25B 11/067* (2021.01)

(52) U.S. Cl.
CPC .......... *C25B 11/069* (2021.01); *C25B 11/077* (2021.01); *C25B 15/029* (2021.01)

(56) References Cited

FOREIGN PATENT DOCUMENTS

CN 106086922 A 11/2016
JP H0733410 A 2/1995

OTHER PUBLICATIONS

Liu et al., "Engineering Bi2O3—Bi2S3 heterostructure for superior lithium storage," Scientific Reports, vol. 5, Article No. 9307, Mar. 23, 2015.
Any identified foreign patents and/or publications were properly submitted in parent application U.S. Appl. No. 16/592,713, filed Oct. 3, 2019, the priority of which is claimed.

\* cited by examiner

METHOD OF PRODUCING HYDROGEN PEROXIDE USING NANOSTRUCTURED BISMUTH OXIDE

BACKGROUND

1. Field

The disclosure of the present patent application relates to the production of hydrogen peroxide, and particularly to a method of producing hydrogen peroxide using nanostructured bismuth oxide by electrochemical reduction of oxygen using an electrode comprising a dendritic nanostructured bismuth oxide ($Bi_2O_{3-x}$).

2. Description of the Related Art

Hydrogen peroxide ($H_2O_2$) is an essential chemical feedstock for chemical industries, medicine and environmental remediation, as well as supplying an oxidant in renewable energy conversion applications and in storage devices. Due to its powerful oxidizing nature, $H_2O_2$ is also used in water treatment and as an energy carrier in many chemical processes without generating toxic by-products. At present, the industrial production of high-purity $H_2O_2$ solution typically relies on an anthraquinone method (i.e., the Riedl-Pfleiderer process), which involves the use of toxic solvents and requires high energy consumption. Transport, handling, and storage of concentrated $H_2O_2$ produced by the method raises further safety concerns. Therefore, an effective in situ $H_2O_2$ production technology is desirable.

$H_2O_2$ may be directly generated electrochemically by oxygen reduction reaction (ORR). ORR in aqueous solutions occurs primarily through two pathways, the direct 4-electron reduction pathway from $O_2$ to $H_2O$, and the 2-electron reduction pathway from $O_2$ to hydrogen peroxide ($H_2O_2$). Non-precious metal electrocatalysts with high selectivity for the electrocatalytic reduction of $O_2$ to $H_2O_2$ are desired for the establishment of green and sustainable chemistry. Bismuth oxide ($Bi_2O_3$) is a p-type semiconductor material with potential as an efficient ORR electrocatalyst due to its low conductivity and reactivity. The effect of oxygen vacancies induced in $Bi_2O_3$, i.e., $Bi_2O_{3-x}$, on electrochemical generation of $H_2O_2$ is not known or predicted.

Thus, a method of producing hydrogen peroxide using nanostructured bismuth oxide solving the aforementioned problems is desired.

SUMMARY

The method of producing hydrogen peroxide using nanostructured bismuth oxide as described herein is an electrochemical approach for producing hydrogen peroxide using a cathode formed as a nanostructured dendritic (ND) oxygen-deficient bismuth oxide ($Bi_2O_{3-x}$) electrode surface. $Bi_2O_{3-x}$ dendritic nanostructures may be grown on a conducting substrate, for example, by first depositing a bismuth film on the substrate, annealing the bismuth film in air to convert the bismuth film to a film of bismuth oxide ($Bi_2O_3$), and then annealing the bismuth oxide film under vacuum to create oxygen vacancies ($Bi_2O_{3-x}$). The deposition step may be electrodeposition. The conducting substrate may be a transparent conducting substrate, such as fluorine-doped tin oxide (FTO). In use, an anode and the cathode prepared in this manner may be immersed in an alkaline medium saturated with oxygen in an electrochemical cell to produce hydrogen peroxide by oxygen reduction reaction.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The method of producing hydrogen peroxide using nanostructured bismuth oxide is an electrochemical method for producing and sensing hydrogen peroxide using a cathode formed as a nanostructured dendritic (ND) oxygen-deficient bismuth oxide ($Bi_2O_{3-x}$) electrode. The cathode is formed by depositing a bismuth film on a conducting substrate using an electrodeposition method, followed by annealing the bismuth film in air to oxidize bismuth to form a film of bismuth oxide ($Bi_2O_3$), and then annealing the bismuth oxide film under vacuum to partially reduce the bismuth oxide to form an oxygen-deficient reduced bismuth oxide ($Bi_2O_{3-x}$, where x is greater than 0 and less than 3) surface on the electrode. The cathode prepared in this manner and an anode are immersed in an alkaline medium saturated with oxygen to form an electrochemical cell for the production of $H_2O_2$.

Oxygen deficient nanodendrite $Bi_2O_{3-x}$ electrodes were controllably prepared through electrodeposition of bismuth on FTO as an exemplary conductive substrate, followed by heat treatment in air to oxidize the bismuth and form bismuth oxide ($Bi_2O_3$), and then by annealing again under vacuum to create oxygen deficiency and reduce the bismuth oxide. Such electrodes will heretofor be referred to as $Bi_2O_{3-x}$ ND/FTO electrodes. The effect of annealing gases on the surface chemistry of $Bi_2O_{3-x}$ ND/FTO electrodes was examined by cyclic voltammetry (CV) and by scanning electron microscopy (SEM), and compared with $Bi_2O_3$ ND/FTO and conventional electrodes, with results shown in the drawings. The overvoltage to perform ORR by cyclic polarization using the exemplary fabricated $Bi_2O_{3-x}$ ND/FTO electrodes is considerably reduced relative to when using the exemplary $Bi_2O_3$ ND/FTO electrodes. The exemplary $Bi_2O_{3-x}$ ND/FTO electrodes result in efficient production of $H_2O_2$ at low overpotential.

The following details the particular materials and methods used in the exemplary implementation of the method. Bismuth (III) nitrate ($Bi(NO_3)_3 \cdot 5H_2O$, ≥98.0%) and ethylene glycol (EG; $HOCH_2CH_2OH$, ≥99.8%) were acquired from Fisher Scientific. All chemicals were used as is. Electrodeposition was carried out in a one compartment cell via a VMP2 multichannel potentiostat system. A classical 3-electrode system comprising a fluoride-doped tin oxide (FTO) working electrode, an Ag/AgCl (4 M KCl) reference electrode, and a Pt counter electrode was used. Bi-metallic films were prepared starting with a 20 mM $Bi(NO_3)_3 \cdot 5H_2O$ solution in EG. The electrodeposition was performed by passing 0.1 C/cm² at E=−1.8 V vs. Ag/AgCl, then resting for 2 s. The cycle was repeated 5 times to pass a total charge of 0.50 C/cm². The electrodeposited Bi-metallic films were annealed at 450° C. for 2 h in air after ramping to the target temperature of 450° C. at a ramping rate of 3.0° C./min to form $Bi_2O_3$ films. The $Bi_2O_3$ films were placed in a porcelain combustion boat and maintained at 350° C. for various times (0.5 to 5.0 h) under vacuum to obtain $Bi_2O_{3-x}$ films.

The fabricated materials were allowed to cool to room temperature under vacuum. The morphology of the electrodes was examined using FESEM (JSM-6380LA). Ultraviolet-visible diffuse reflectance spectroscopy (UV-DRS) measurements were performed using a Hitachi U-3010. The crystallinity and purity of exemplary electrodes fabricated as described herein was investigated by X-ray diffraction (XRD) on a Bruker D8-Advance Diffractometer via Cu Kα radiation (λ=1.5418 Å).

The theoretical value of the Levich slope (B) is evaluated from the following equation:

$$B = 0.62 \times n \times F \times C_{O_2} \times D_{O_2}^{2/3} \times v^{-1/6}$$

where n is the electron transfer number in ORR, F is the Faradic constant (96,485 C mol⁻¹), $C_{O_2}$ is the saturated oxygen concentration in 0.1M NaOH aqueous solution ($1.2 \times 10^{-6}$ mol cm⁻³), $D_{O_2}$ is the oxygen diffusion coefficient ($1.73 \times 10^{-5}$ cm² s⁻¹) and v is the kinematic viscosity of the solution (0.01 cm² s⁻¹).

Figure 1A:
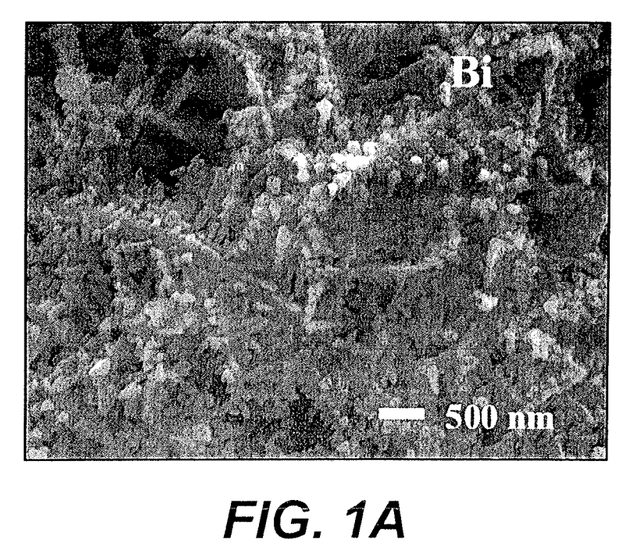
FIG. 1A is a Field Emission Scanning Electron Microscopy (FESEM) micrograph top view of bismuth film electrodeposited on a fluorine-doped tin oxide (FTO) substrate as a first step in forming an electrode.
Figure 1B:
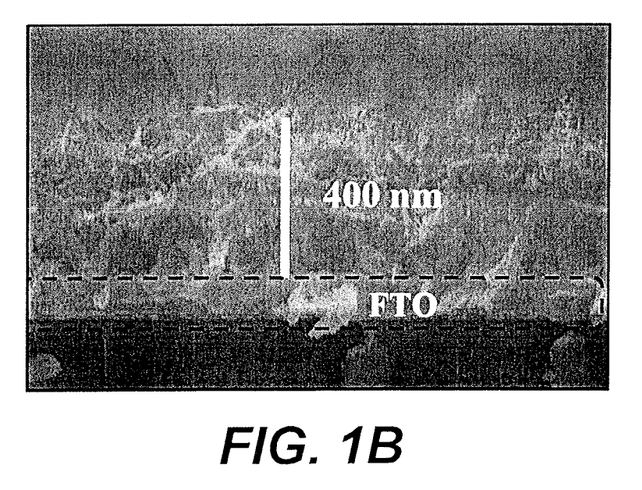
FIG. 1B is a FESEM micrograph side view of bismuth electrodeposited on an FTO substrate.
Figure 1C:
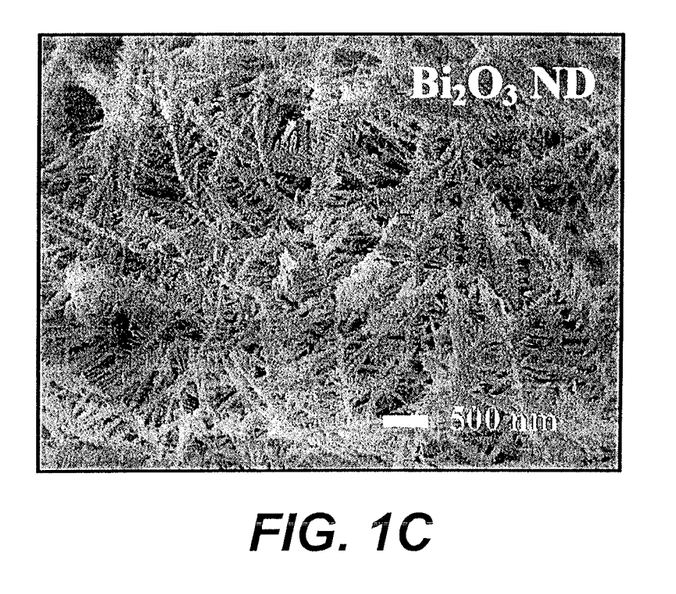
FIG. 1C is a FESEM micrograph of the electrode of FIG. 1A after annealing the electrode in air to convert the bismuth to $Bi_2O_3$.
Figure 1D:
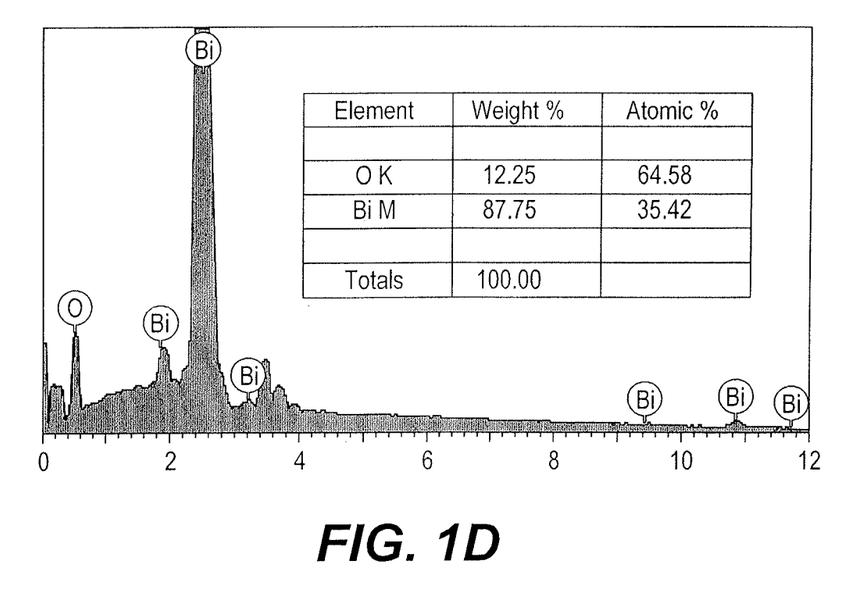
FIG. 1D is an Energy Dispersive Spectrographic (EDS) spectrum of the $Bi_2O_3$ deposited on the electrode of FIG. 1C.
Figure 1E:
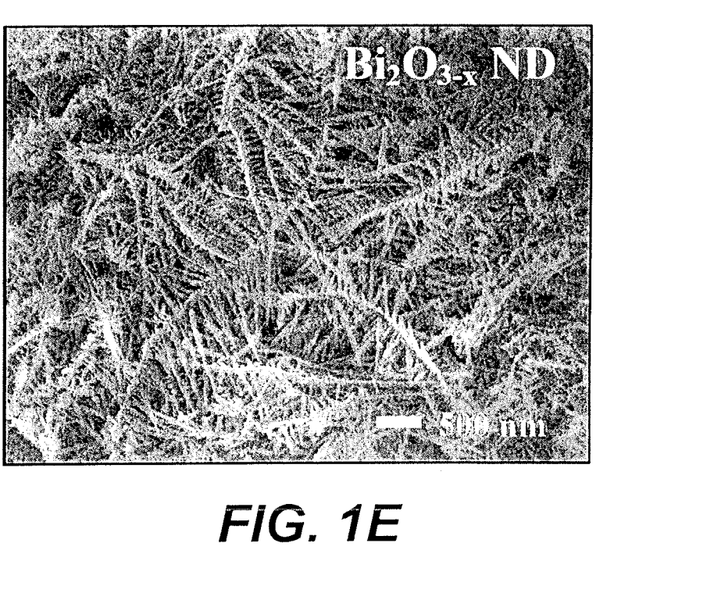
FIG. 1E is a FESEM micrograph of the electrode of FIG. 1C after subsequently annealing the electrode under vacuum to form an oxygen deficient $Bi_2O_{3-x}$/FTO electrode.
Figure 1F:
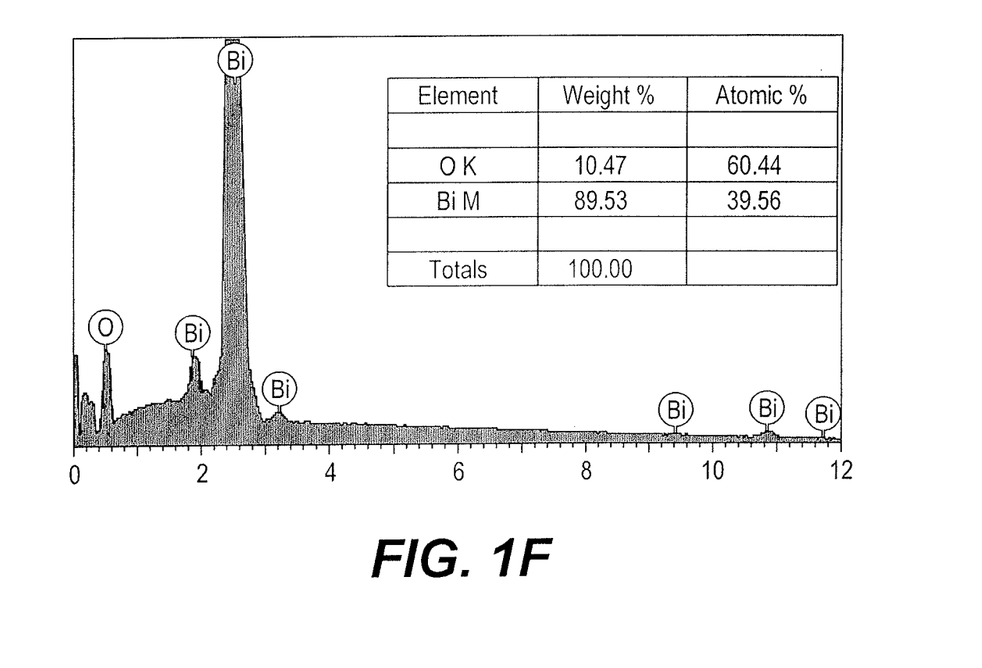
FIG. 1F is an EDS spectrum of the oxygen deficient $Bi_2O_{3-x}$ deposited on the electrode of FIG. 1E.

The structure and morphology of the Bi-metallic film, $Bi_2O_3$ film, and $Bi_2O_{3-x}$ film during the electrophoretic deposition and annealing processes in the fabrication of $Bi_2O_{3-x}$ ND/FTO were characterized by SEM. FIG. 1A shows FESEM images of the Bi-metallic dendritic nanostructures electrodeposited (charge: 0.5 C cm⁻²) on an FTO substrate. The FESEM images show that nano-aggregates of deposited Bi form randomly arranged nanodendrites with a micro-nano hierarchical structure (see also FIG. 1B) suitable for electrochemical applications. Dendrites in the range of 1-2 μm in length feature many nano-scaled dendrite side branches less than 200 nm in length. Bi ND/FTO electrodes are converted to $Bi_2O_3$ ND/FTO by annealing in air, as described previously, the resulting nanostructures being shown in FIG. 1C and further characterized by EDS analysis, as shown in FIG. 1D. After air annealing, the main branches appear to increase in length and the side branches exhibit more defined, leaf-like morphologies. In other words, well-defined nanodendrites are formed in the process of forming the $Bi_2O_3$ film. The FESEM image of a $Bi_2O_{3-x}$ ND/FTO electrode shows no significant changes occur in morphology during vacuum annealing, as shown in FIG. 1E. The corresponding EDS analysis is provided in FIG. 1F.

Figure 2:
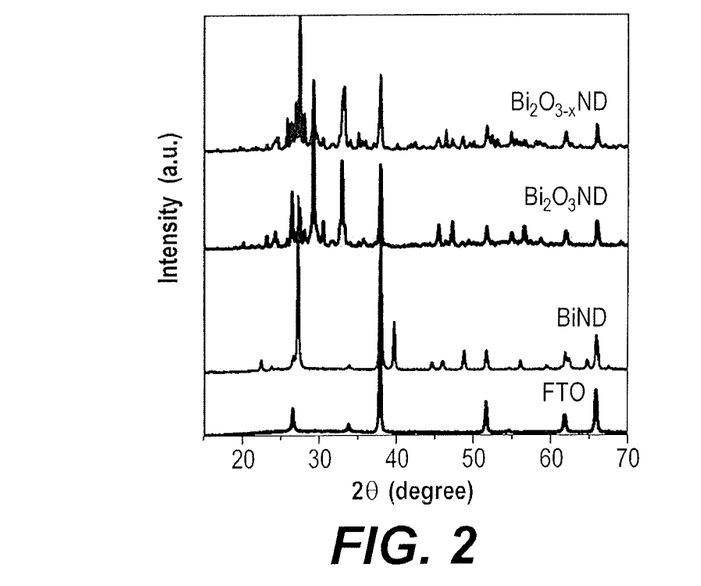
FIG. 2 is a composite X-ray powder diffraction (XRD) diffractogram comparing patterns for Bi nanostructured dendritic (ND) film, $Bi_2O_3$ ND and $Bi_2O_{3-x}$ ND on FTO substrates.

The XRD diffractogram patterns of the Bi ND, $Bi_2O_3$ ND and $Bi_2O_{3-x}$ ND films are shown in FIG. 2. The 2θ values may be compared with standard values to identify crystalline structures in the material. The diffraction peaks observed in $Bi_2O_3$ ND and $Bi_2O_{3-x}$ ND match well with the standard JCPDS card number 27-0050 of β-$Bi_2O_3$, which crystallizes in a tetragonal system. The diffraction peaks of the $Bi_2O_3$ ND and $Bi_2O_{3-x}$ ND samples can be indexed well to corresponding single phases, which crystallize in a tetragonal β-$Bi_2O_3$ system (JCPDS No. 27-0050). The sharp diffraction peaks of $Bi_2O_3$ ND and $Bi_2O_{3-x}$ ND indicate that each exhibits high crystallinity. However, in the case of $Bi_2O_{3-x}$ ND, the diffraction peaks become much broader and weaker, which indicates its reduced crystallinity relative to the $Bi_2O_3$ ND.

Figure 3:
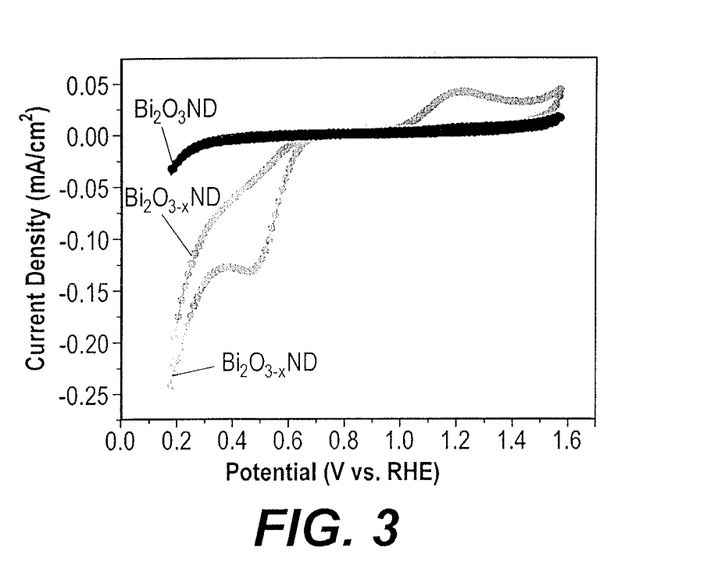
FIG. 3 is a composite cyclic voltammetry (CV) voltammogram comparing traces of $Bi_2O_3$ ND/FTO electrodes (without being annealed under vacuum) with $Bi_2O_{3-x}$ ND/FTO electrodes (rendered oxygen deficient by annealing under vacuum) in alkaline solution.

The electrochemical activity of $Bi_2O_3$ ND and $Bi_2O_{3-x}$ ND electrodes was further examined for application as catalysts in ORRs performed in $O_2$-saturated alkaline solution. For the $Bi_2O_{3-x}$ ND, annealing under vacuum was performed at 350° C. for 120 min. FIG. 3 shows the results of cyclic voltammograms (CVs) for each of the exemplary electrodes performed at 50 mV s⁻¹ in 0.1 M NaOH. In the presence of $O_2$, the $Bi_2O_3$ ND electrode displays a low current plateau in the potential window from 0.2 to 1.5 V vs. RHE (reversible hydrogen electrode, used to calibrate the reference electrode). Further, the $Bi_2O_3$ ND electrode does not show any reduction peak in the measured potential region. In contrast, the $Bi_2O_{3-x}$ ND electrode show well-defined reduction peaks at 0.45 V vs RHE. The $Bi_2O_{3-x}$ ND electrode exhibits well-defined high redox peak currents, indicating greater electrochemical reversibility than the $Bi_2O_3$ ND electrode. The peak-to-peak separation for the $Bi_2O_{3-x}$ ND electrode is estimated to be 0.75 V. In comparison to $Bi_2O_3$ ND electrodes, oxygen deficient $Bi_2O_{3-x}$ ND electrodes produced by vacuum annealing of $Bi_2O_3$ ND show considerably enhanced electronic conductivity and reactivity in the ORR process. This could possibly, but without being bound by theory, be due to the large number of oxygen defects created, which provide oxygen vacancies that could serve as acceptors, resulting in semiconducting activity, thereby facilitating reactant adsorption and charge transfer.

Figure 4:
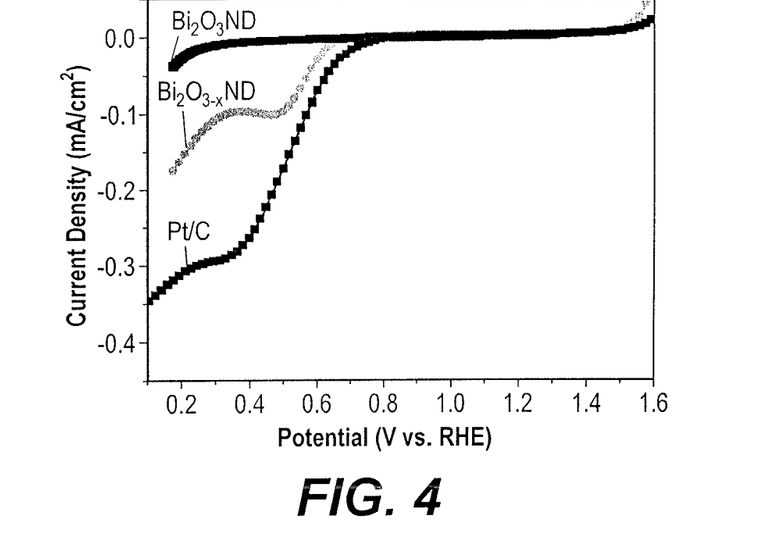
FIG. 4 is a composite linear sweep voltammetry (LSV) voltammogram comparing traces of $Bi_2O_3$ ND/FTO electrodes, $Bi_2O_{3-x}$ ND/FTO electrodes, and Pt (20%)/C electrodes in alkaline solution.

During ORR, linear sweep voltammogram (LSV) measurements were carried out for the $Bi_2O_3$ ND electrode and the $Bi_2O_{3-x}$ ND electrode, in comparison with state of the art Pt/C catalysts. Results of these measurements are presented in FIG. 4. FIG. 4 illustrates that the oxygen deficient $Bi_2O_{3-x}$ ND electrodes provide significantly more electrocatalytic activity compared to $Bi_2O_3$ ND (but lower than Pt/C catalysts in the alkaline electrolyte), demonstrated by the more positive onset and half-wave potentials. Additionally, the different electrocatalytic behavior observed with $Bi_2O_{3-x}$ ND/FTO and $Bi_2O_3$ ND/FTO electrodes during ORR indicates that more active ORR sites are available on the $Bi_2O_{3-x}$ ND/FTO electrodes, possibly due to the available oxygen vacancies.

The oxygen reduction potentials are more positive for the $Bi_2O_{3-x}$ ND electrode relative to the $Bi_2O_3$ ND and Pt/C electrodes, which suggests enhanced catalytic performance towards ORR.

Figure 5A:
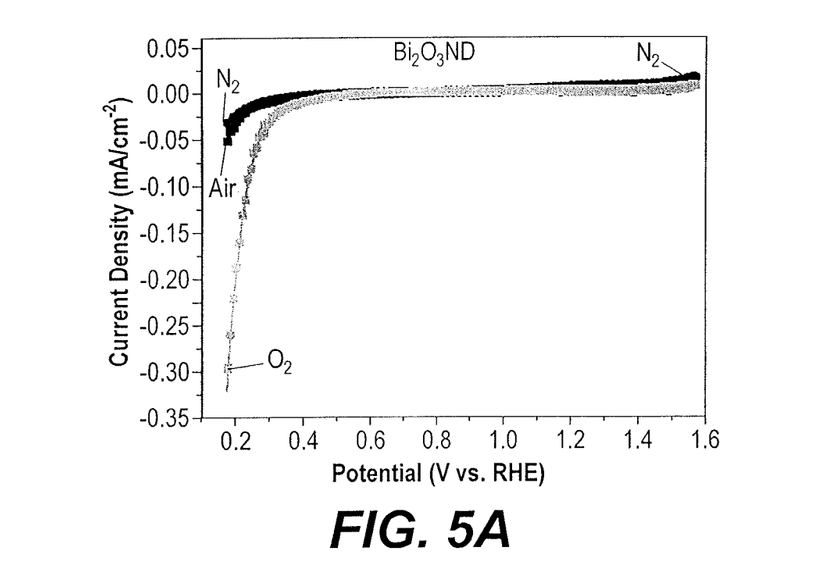
FIG. 5A is a composite LSV voltammogram comparing traces taken with a $Bi_2O_3$ ND/FTO electrode in alkaline solution where the solution was purged for 20 min with either pure nitrogen ($N_2$), air or pure oxygen ($O_2$).
Figure 5B:
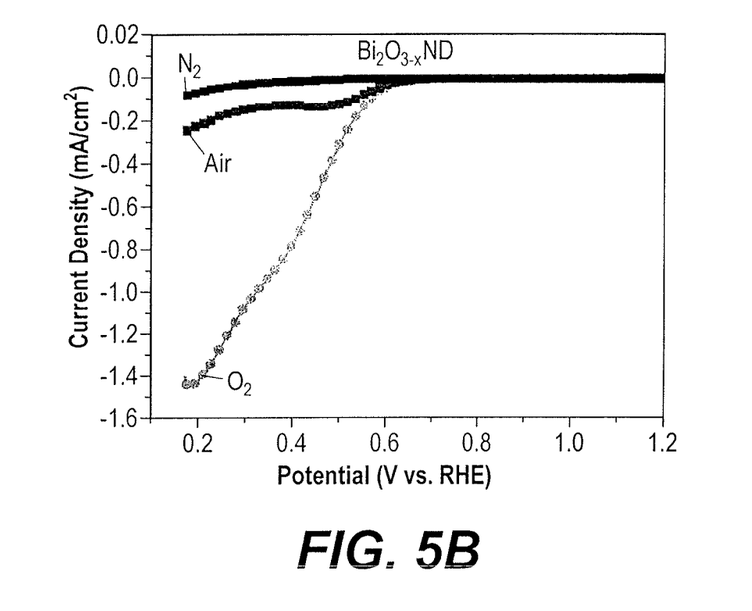
FIG. 5B is a composite LSV voltammogram comparing traces taken with a $Bi_2O_{3-x}$ ND/FTO electrode in alkaline solution where the solution was purged for 20 min with either pure nitrogen ($N_2$), air, or pure oxygen ($O_2$).
Figure 5C:
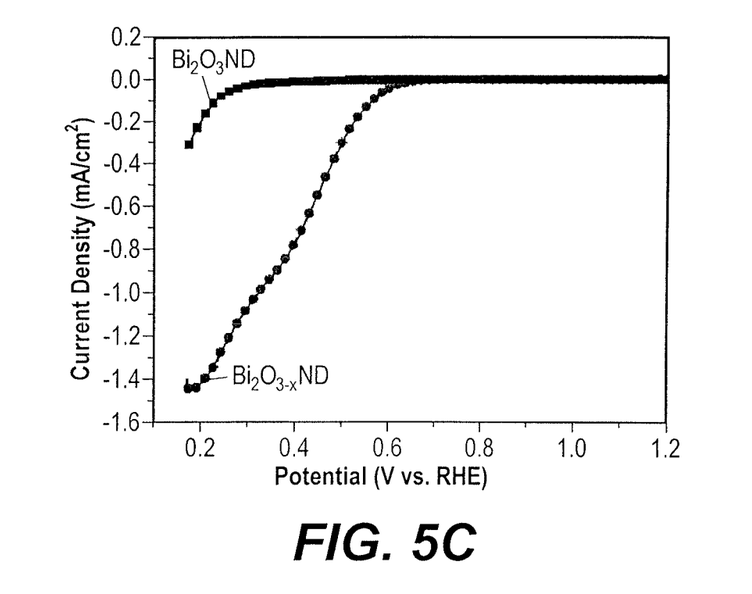
FIG. 5C is a composite LSV voltammogram comparing a trace taken with a $Bi_2O_3$ ND/FTO electrode in alkaline solution saturated with oxygen to a trace taken with a $Bi_2O_{3-x}$ ND/FTO electrode in alkaline solution saturated with oxygen.

To confirm the identity for the oxygen reduction peaks at the $Bi_2O_3$ ND and $Bi_2O_{3-x}$ ND electrodes, the effect of oxygen concentration in alkaline media was examined by purging the medium with one of $O_2$, air or $N_2$. FIGS. 5A-5C show the CV traces taken at exemplary a $Bi_2O_3$ ND and $Bi_2O_{3-x}$ ND electrodes in the different oxygen concentrations in 0.1 M NaOH. The CV for the $Bi_2O_{3-x}$ ND electrodes in deoxygenated ($N_2$) solution (FIG. 5A) shows no reduction peak in the measured region. The CV for the $Bi_2O_{3-x}$ ND electrodes in moderate oxygen conditions (electrolyte solution purged with air, FIG. 5B) exhibits oxygen reduction peaks, and in high oxygen conditions (electrolyte purged with $O_2$, FIG. 5C) shows further increased electrocatalytic current. Finally, these results suggest the observed peaks are due to the reduction of oxygen at $Bi_2O_{3-x}$ ND electrodes, and we speculate that the reduction process at potential 0.46 V vs RHE, which corresponds to the reduction of $O_2$ by two electrons to give $H_2O_2$ (or more correctly $HO_2^-$). Comparing the CV curves of $Bi_2O_{3-x}$ ND electrodes and $Bi_2O_3$ ND electrodes, it appears that electrocatalytic reduction of oxygen on the electrode is more effective in the $Bi_2O_{3-x}$ system, which provides greater cathodic current than $Bi_2O_3$ ND in 0.1 M NaOH aqueous electrolyte. In comparison with the $Bi_2O_3$ ND electrode, the increase of current response of $Bi_2O_{3-x}$ suggests that generated oxygen vacancies play a main part in the electrochemical production of $H_2O_2$.

Figure 6A:
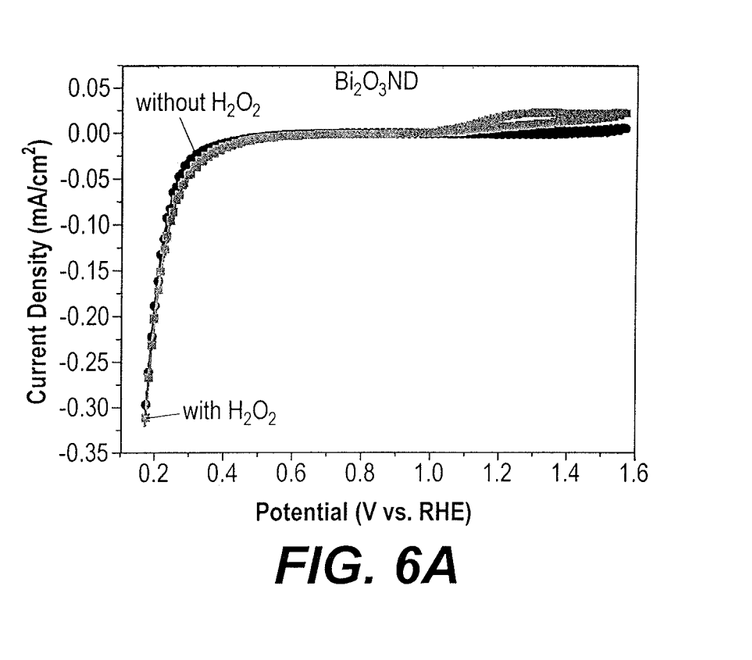
FIG. 6A is a composite CV voltammogram taken in alkaline solution comparing a CV trace of a $Bi_2O_3$ ND/FTO electrode before addition of $H_2O_2$ with a CV trace of a $Bi_2O_3$ ND/FTO electrode after addition of 0.4M $H_2O_2$ (30%).
Figure 6B:
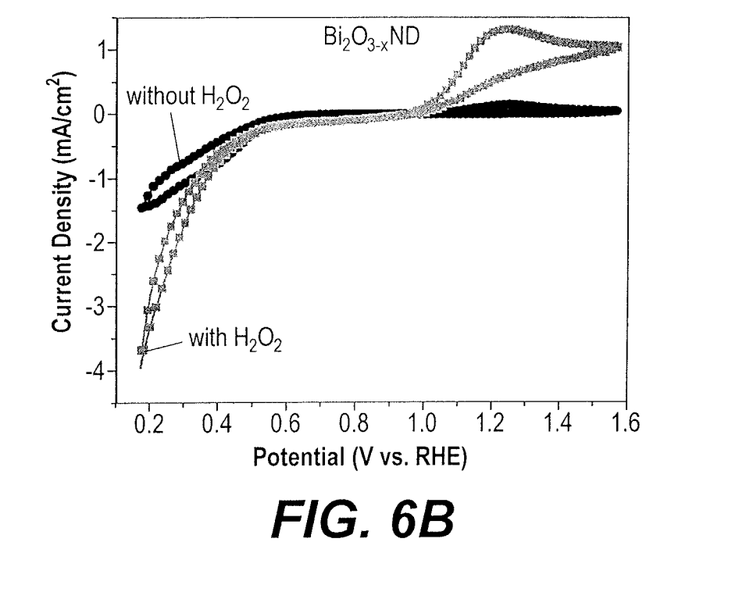
FIG. 6B is a composite CV voltammogram taken in alkaline solution comparing a CV trace of a $Bi_2O_{3-x}$ ND/FTO electrode before addition of $H_2O_2$ with a CV trace of a $Bi_2O_{3-x}$ ND/FTO electrode after addition of 0.4M $H_2O_2$ (30%).

To determine the electrochemical response to $H_2O_2$, CV was performed in the absence and presence of 0.4 M $H_2O_2$, where $Bi_2O_3$ and $Bi_2O_{3-x}$ electrodes were compared and are demonstrated in FIGS. 6A-6B. FIG. 6A shows the CVs with addition of 0.4 M $H_2O_2$ aliquots into 0.1 M NaOH solution at $Bi_2O_3$ ND electrode. The $Bi_2O_3$ ND electrode shows nearly no reduction behavior, demonstrating that the reduction of $H_2O_2$ was hardly attained at this electrode. In contrast, the $Bi_2O_{3-x}$ ND electrode displays much greater response signals with much greater catalytic current and lowers the over potential value, as shown in FIG. 6B. This result clearly indicates that the oxygen deficient nature of $Bi_2O_{3-x}$ plays a critical role in $H_2O_2$ reduction behavior.

Figure 7A:
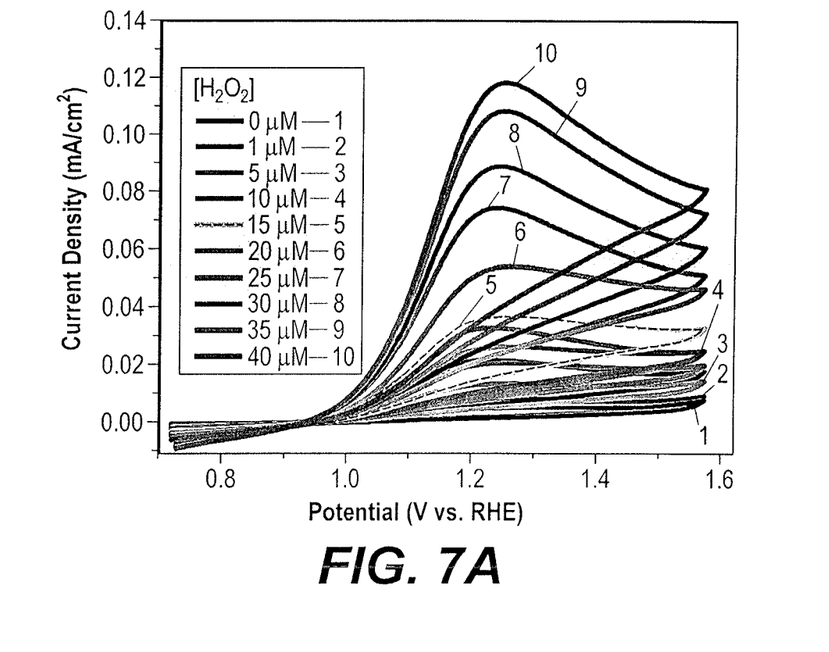
FIG. 7A is a composite CV voltammogram taken in alkaline solution comparing CV traces made upon sequential additions of μM aliquots of $H_2O_2$ to the solution.
Figure 7B:
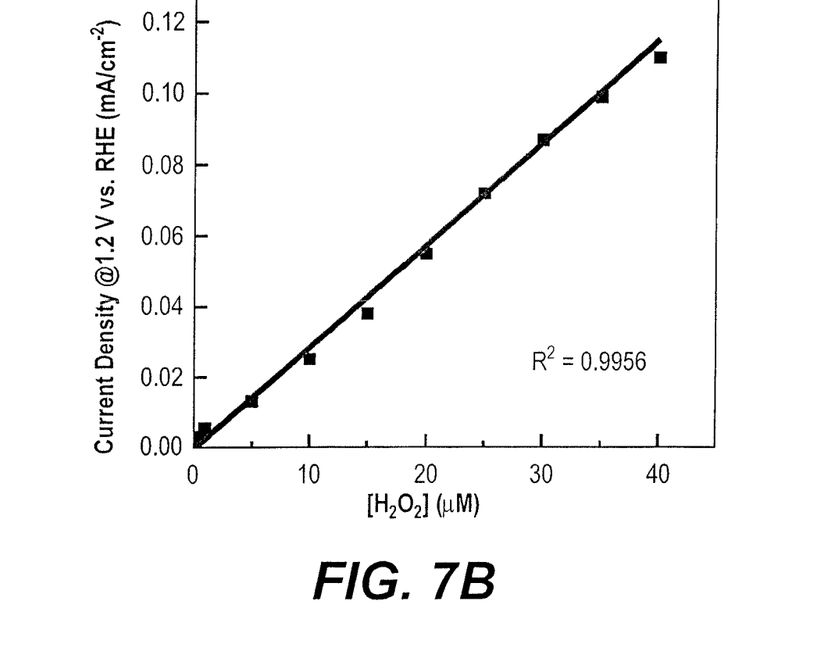
FIG. 7B is a plot of peak current as a function of $H_2O_2$ content/concentration based upon the traces in FIG. 7A.
Figure 7C:
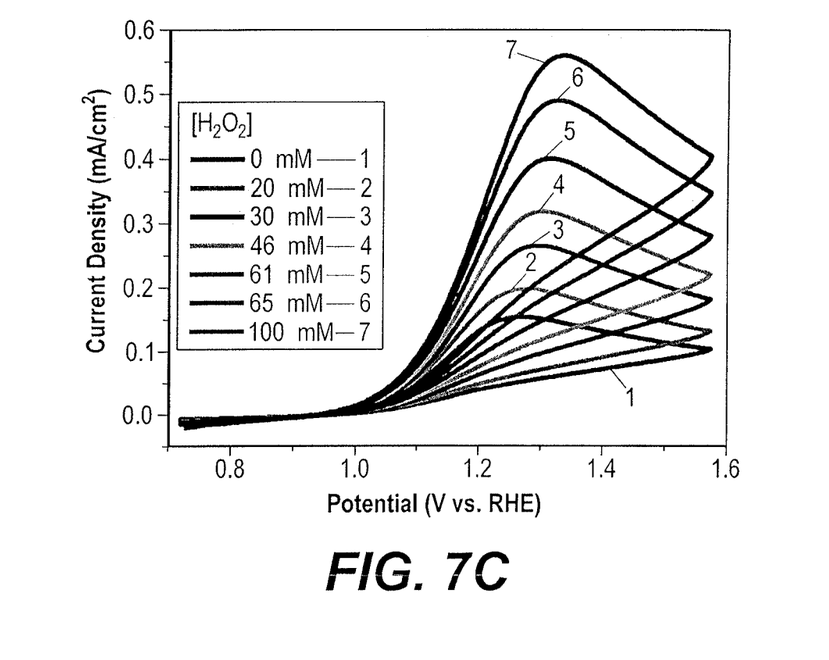
FIG. 7C is a composite CV voltammogram taken in alkaline solution comparing CV traces made upon sequential additions of mM aliquots of $H_2O_2$ to the solution.
Figure 7D:
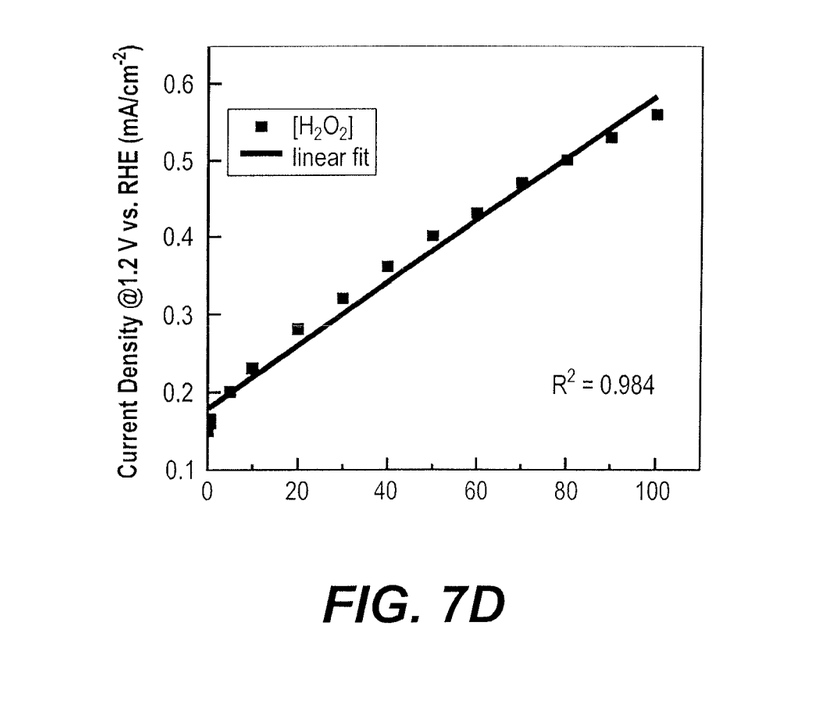
FIG. 7D is a plot of peak current as a function of $H_2O_2$ content/concentration based upon the traces in FIG. 7C.

FIG. 7A displays CVs taken with sequential addition of $H_2O_2$ aliquots in the range of 0-40 μM into 0.1 M NaOH solution at $Bi_2O_{3-x}$ ND electrodes. In $N_2$ saturated 0.1 M NaOH, the reduction peak current of $H_2O_2$ increases gradually following the addition of $H_2O_2$ concentration. As shown in FIG. 7B, there is a good linear relationship between the peak current and $H_2O_2$ concentration in the range of 0~40 μM (R=0.9957). FIG. 7C displays CVs taken with sequential addition of $H_2O_2$ aliquots in the range of 0-100 mM into 0.1 M NaOH solution at $Bi_2O_{3-x}$ electrodes. FIG. 7D displays a good linear relationship between the peak current and $H_2O_2$ concentration at the range of 0~100 mM (R=0.984). Upon the continued addition of $H_2O_2$, remarkable current increase at the oxidation peak is observed, confirming the exceptional oxidizing effect of $Bi_2O_{3-x}$ toward $H_2O_2$. In addition, the oxidation potential exhibits a slight positive shift, potentially signifying a kinetic limitation of the $H_2O_2$ oxidation reaction.

Figure 8A:
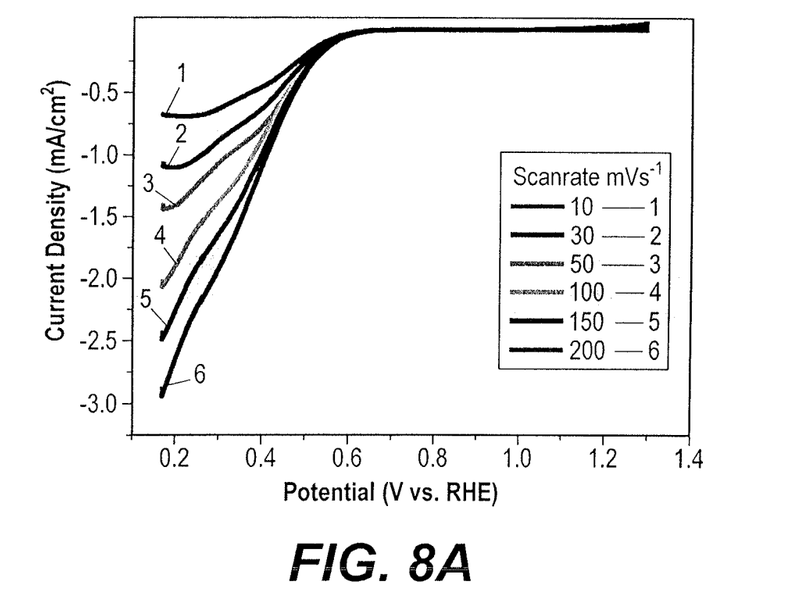
FIG. 8A is a composite LSV voltammogram comparing LSV traces taken at different scan rates for a $Bi_2O_{3-x}$ ND/FTO electrode in oxygen saturated alkaline solution.
Figure 8B:
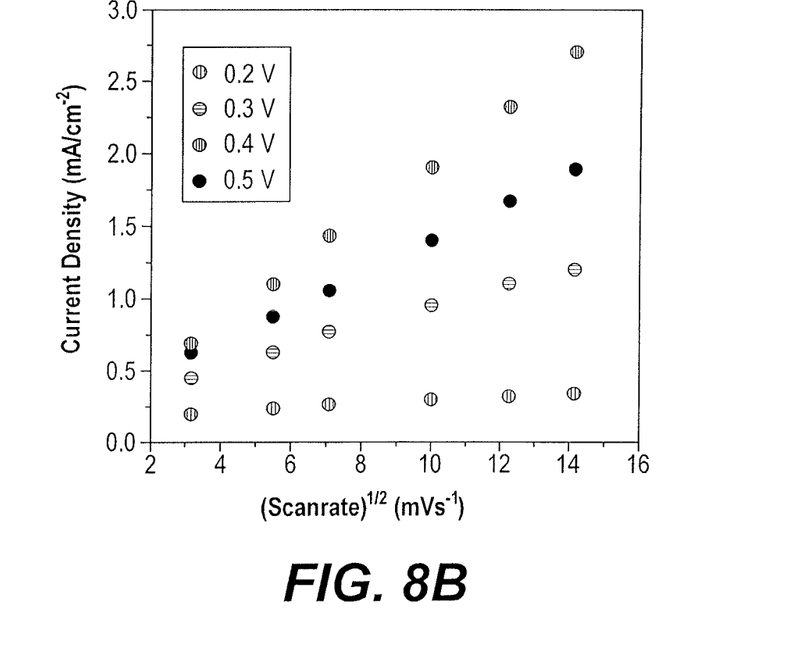
FIG. 8B is a plot of peak currents as a function of the square root of the scan rate for the traces in FIG. 8A.

FIG. 8A displays the influence of the scan rate on the ORR process at $Bi_2O_{3-x}$ ND electrodes in 0.1 M NaOH saturated with $O_2$. Further, the association between the cathodic current and the square root of the scan rate is shown in FIG. 8B. For $Bi_2O_{3-x}$ ND electrodes, both oxygen reduction peak currents increase linearly with the square root of potential scan rate, signifying that the overall ORR process at this electrode is dominated by the diffusion of $O_2$ from solution to the oxygen vacancies at surface sites. Moreover, with increased $H_2O_2$ concentration, the reduction peak currents shifted toward more negative potentials, suggesting a possible kinetic limitation in the reaction between $Bi_2O_{3-x}$ ND/FTO and $H_2O_2$.

The $Bi_2O_{3-x}$ ND electrodes allow for production of $H_2O_2$ at low overpotentials. Annealing of metal oxides under vacuum is a simple, scalable and low cost way of creating oxygen vacancies to create highly efficient catalysts for $H_2O_2$ generation.

It is to be understood that the method of producing hydrogen peroxide using nanostructured bismuth oxide are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of producing hydrogen peroxide using nanostructured bismuth oxide, comprising the steps of:
    immersing an anode and a cathode in an alkaline solution saturated with oxygen in an electrolytic cell, the cathode being a conducting substrate having a surface layer of nanostructured oxygen-deficient bismuth oxide of formula $Bi_2O_{3-x}$, wherein x is greater than 0 and less than 3;
    establishing an electrical potential across the cathode and the anode to initiate reduction of the oxygen at the cathode, thereby producing hydrogen peroxide.

2. The method of producing hydrogen peroxide according to claim 1, wherein the surface layer of said cathode comprises a film of $Bi_2O_{3-x}$ including nanosize dendritic structures formed by the $Bi_2O_{3-x}$.

3. The method of producing hydrogen peroxide according to claim 1, wherein the alkaline solution comprises NaOH solution saturated with oxygen.

4. The method of producing hydrogen peroxide according to claim 1, wherein the alkaline solution comprises 0.1 M NaOH solution saturated with oxygen.

\* \* \* \* \*